No. 776,571. PATENTED DEC. 6, 1904.
A. M. WARD.
SCREW LOCK FOR EYEGLASSES.
APPLICATION FILED FEB. 1, 1904.
NO MODEL.
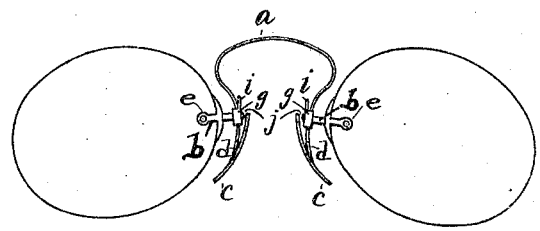
Fig.1.
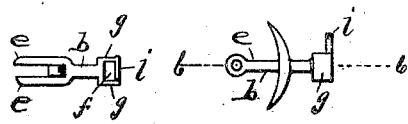 
Fig.2. Fig.3. Fig.4.
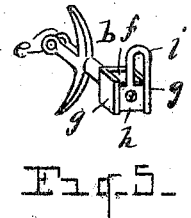 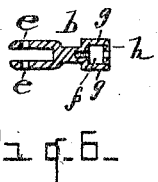 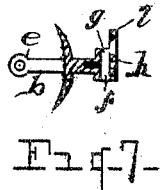
Fig.5. Fig.6. Fig.7.
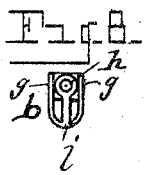
Fig.8.
WITNESSES: Albert M. Ward INVENTOR.
BY Newell S. Wright
ATTORNEY.

No. 776,571. Patented December 6, 1904.

UNITED STATES PATENT OFFICE.

ALBERT M. WARD, OF DETROIT, MICHIGAN, ASSIGNOR TO GEORGE JOHNSTON, OF DETROIT, MICHIGAN.

SCREW-LOCK FOR EYEGLASSES.

SPECIFICATION forming part of Letters Patent No. 776,571, dated December 6, 1904.

Application filed February 1, 1904. Serial No. 191,517. (No model.)

*To all whom it may concern:*

Be it known that I, ALBERT M. WARD, a citizen of the United States, residing at Detroit, county of Wayne, State of Michigan, have invented a certain new and useful Improvement in Screw-Locks for Eyeglasses, of which the following is a specification, reference being had to the accompanying drawings, which form a part of this specification.

My invention has for its object to provide a screw-lock for eyeglasses; and it consists of the construction, combination, and arrangement of devices hereinafter described and claimed, and illustrated in the accompanying drawings, in which—

Figure 1 is a view in elevation of a pair of eyeglasses embodying my invention. Fig. 2 is a detail view of the attaching or lens post in elevation. Fig. 3 is a view of the post in elevation at right angles to that shown in Fig. 2. Fig. 4 is a view in elevation looking at the inner end of the post. Fig. 5 is a view of the post in perspective. Fig. 6 is a view in longitudinal section through the post. Fig. 7 is also a view in longitudinal section through the post, the section being taken at right angles to that shown in Fig. 6. Fig. 8 is an end view of the post, showing a modification in the construction of the washer and its connecting-arms.

Heretofore, as is well known, there has been a tendency of the spring and nose-guards loosening the screw attaching the spring and nose-guards to the stud or post engaged upon the eyeglasses. The purpose of my invention is to overcome this liability of the screw becoming loosened, and to this end I carry out my invention as follows.

In the drawings, $a$ represents the spring connecting the eyeglasses. The studs or posts connected with the eyeglasses are indicated at $b\ b$, upon the inner ends of which are connected the corresponding extremities of the spring and the corresponding nose-guards $c\ c$.

I do not limit myself to any particular construction of the nose-guards, the guards shown being provided with an attaching-arm $d$. The glasses shown herewith are rimless; but my invention is equally applicable to eyeglasses with or without rims or frames.

My invention consists more particularly of the construction of the posts or studs $b$. In the drawings said studs are shown provided with attaching-arms $e$ at one extremity thereof and with a recess $f$ at the opposite extremity, formed by lateral flanges or walls $g$. A washer is indicated at $h$, said washer being integrally connected with the post by a yielding arm $i$, said arm being shown integrally connected with one or with both of the walls $g$. The attaching-screw is indicated at $j$. It will be understood that the washer $h$ and the stud, as well as the extremities of the spring $a$ and of the attaching-arms $d$, are suitably perforated to receive the corresponding attaching-screws, the screws having a threaded engagement with the posts.

In Figs. 1 to 7 of the drawings the washer is shown attached by an arm $i$ to only one of the walls $g$ of the post.

In Fig. 8 the attaching-arm $i$ is attached to both the walls forming the recess of the post. The yielding arm of the washer within the scope of my invention, I would have it understood, may be attached in any suitable manner to the post, so that it shall be rigidly connected therewith either to both the walls $g\ g$ or otherwise, as may be desired. Thus the posts might be formed with an arm and walls integrally stamped out, or the arms might be soldered to the posts or otherwise rigidly secured thereto in any preferred manner. By connecting the arm $i$ with both the side walls, as shown in Fig. 8, the arm $i$ serves also as a brace for said walls. Where the arm $i$ is thus attached to both walls, the head of the washer would project inwardly into the recess. In assembling the parts the arm $d$ of the corresponding nose-guard and extremity of the spring are brought into position into the corresponding recess $f$ of the stud and in under the washer $h$. The corresponding screw is then forced into place, the arm $i$ of the washer $h$ yielding to permit the head of the screw being brought into firm frictional contact with the washer. While the washer may yield longitudinally of the stud, it will be seen that it is effectually held from movement in any other direction. The spring-arm $i$ is sufficiently rigid to prevent the washer from turning by the strain of the screw in its tendency to loosen or revolve on account of the strain of the spring and nose-guard thereupon. The washer so connected with the stud is designed and adapted to prevent any twisting motion in consequence of the friction of the head of the screw thereupon, so that the tendency of the screw to be revolved or loosened is effectually prevented. The washer thus becomes practically a part of the stud and being located underneath the screw-head can have no circular motion, its arm $i$ being made sufficiently rigid in its connection with the stud to prevent any such motion. I have shown the head of the washer made both circular and rectangalur, and would have it understood that I do not confine myself to any particular construction or shape thereof. It will be seen that as the screw is forced into place the arm $i$ permits the washer to yield correspondingly longitudinally of the post.

The posts are provided with the customary flanges to engage the edge of the lenses.

What I claim as my invention is—

1. A screw-lock for eyeglasses comprising an attaching stud or post having a washer connected therewith by an intervening yielding arm, the washer at the end thereof opposite said arm being free.

2. A screw-lock for eyeglasses comprising an attaching recessed post having a washer located in the recess of the post, and connected at one side thereof with the post by an intervening yielding arm, said washer at the opposite side being free.

3. A screw-lock for eyeglasses having in combination an attaching stud or post formed with a recess at one extremity thereof, a spring to connect the eyeglasses, nose-guards, a washer located over the ends of the spring and nose-guard and secured to the post at one side of the washer by an intervening yielding arm, said washer at the opposite side being free.

4. A screw-lock for eyeglasses comprising an attaching recessed post having a washer connected with both of the walls of the recess by an intervening yielding arm, the side of the washer opposite said arm being free.

5. A screw-lock for eyeglasses comprising an attaching stud or post having lateral walls forming an intermediate recess therebetween at one end of the stud or post, and a washer having a yielding arm connected with the stud or post at one side thereof, said washer at the opposite side being free, said arm bent to carry the washer into the said recess.

6. A screw-lock for eyeglasses comprising an attaching stud or post, and a washer provided with a yielding arm secured at one side of the washer to said stud or post, said washer at the opposite side being free said washer and arm formed of an integral piece of sheet metal.

7. A screw-lock for eyeglasses comprising an attaching stud or post, having a washer connected therewith by an intervening yielding arm extended longitudinally of the flanges of the post, the washer at the end thereof opposite said arm being free.

8. A screw-lock for eyeglasses comprising an attaching stud or post having a washer connected therewith by an intervening U-shaped arm.

In testimony whereof I have signed this specification in the presence of two subscribing witnesses.

ALBERT M. WARD.

Witnesses:
 N. S. WRIGHT,
 M. L. SIMMONS.